United States Patent [19]
Converse

[11] 4,436,341
[45] Mar. 13, 1984

[54] INFANT SAFETY CAR SEAT

[76] Inventor: Maurice Converse, 1311 Briarhill Dr., Akron, Ohio 44313

[21] Appl. No.: 276,300

[22] Filed: Jun. 22, 1981

[51] Int. Cl.³ .............................................. A47C 1/08
[52] U.S. Cl. .................................... 297/250; 297/216; 297/464; 297/467; 297/484
[58] Field of Search ............... 297/250, 216, 254, 467, 297/484, 488, 487, 464, 470

[56] References Cited

U.S. PATENT DOCUMENTS

| | | | |
|---|---|---|---|
| 2,227,717 | 1/1941 | Jones | 297/470 X |
| 2,649,145 | 8/1953 | McCarthy | 297/470 |
| 3,107,121 | 10/1963 | Mougey | 297/474 |
| 3,563,600 | 2/1971 | Converse | 297/488 X |
| 4,033,622 | 7/1977 | Boudreac | 297/250 |
| 4,342,483 | 8/1982 | Takada | 297/484 X |
| 4,343,510 | 8/1982 | Cone | 297/488 |

FOREIGN PATENT DOCUMENTS 2147248  3/1973  Fed. Rep. of Germany ...... 297/216

Primary Examiner—James T. McCall
Attorney, Agent, or Firm—Sughrue, Mion, Zinn, Macpeak & Seas

[57] ABSTRACT

An infant safety car seat having back, side, seat and bottom portions is also provided with a detachable front cross piece having a crotch piece dependent therefrom. A restraint harness is provided with shoulder straps connected to spring restraining devices in the back portion, a front piece and a crotch strap hooked over a pin which protrudes forwardly of said seat portion into an aperture in said crotch piece. The crotch strap is also detachably connected to the crotch piece so that when the cross piece is detached from the side portions and separated therefrom the crotch strap will automatically be unhooked from the pin prior to separating from the crotch piece. An adjustable lap belt is carried completely by the front cross piece.

5 Claims, 4 Drawing Figures

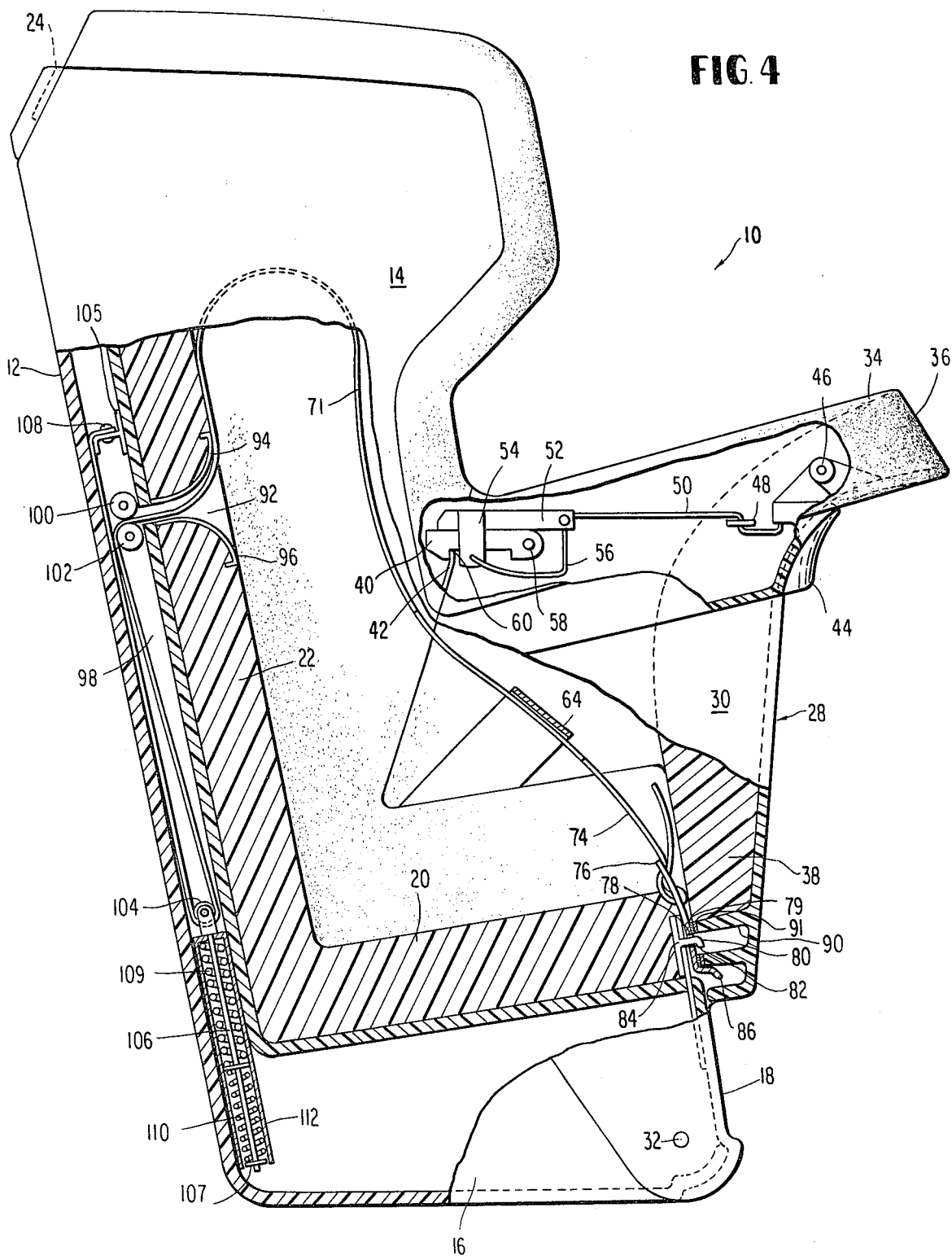

INFANT SAFETY CAR SEAT

BACKGROUND OF THE INVENTION

The present invention is directed to padded safety seats of the type used for holding infants while riding in an automobile and more specifically to a quick release arrangement for the infant restraining belts and detachable front cash pad associated with the seat.

It has been proposed in the prior art to utilize a self-contained infant safety seat in conjunction with the conventional automobile seat for holding infants while travelling in an automobile. Such prior art devices usually include an infant seat which is secured to the automobile seat by rigid hooks which fit over the back of the vehicle seat. It has also been proposed to utilize the automobile safety seat belt to secure the base of an infant-type safety seat to the automobile seat and to use a harness in conjunction with the infant seat to restrain the infant. However, such devices generally do not provide a means for positively securing the infant seat to the automobile seat since the automobile safety belt is usually just secured around the base of the seat, thus allowing the seat to slip through the belt in the event of an automobile turnover.

Other prior art devices, while incorporating a harness in conjunction with the seat, do not allow limited free movement of the infant since the harnesses of prior art devices are of the type which are adapted to substantially completely restrain the infant from movement within the seat. However, a child will not tolerate tight restraints and shoulder straps associated with such harnesses are difficult and cumbersome to put in place. Furthermore, such straps are generally provided with complicated buckles or fastening means which would impede the quick removal of the child from the seat in an emergency situation such as the vehicle catching on fire.

In applicant's own prior U.S. Pat. No. 3,563,600 granted Feb. 16, 1971 an infant safety car seat was disclosed having a base portion adapted to rest on an automobile seat. The conventional automotive lap safety belt extended about the base of the chair and an additional strap extending vertically about the seat back was provided with an adjustable connector adapted to cooperate with a slot in the upper portion of the infant car seat to completely secure the infant safety seat to the automobile seat. The infant safety car seat was constructed from a molded plastic shell-like member having a removable front portion which susbstantially encapsulated the child. Quick release latch means were provided for detachably securing the front portion to the side portions of the seat and a combination vest-harness for the child was detachably connected to the seat independently of the detachable front portion. Therefore, in order to remove the child from the seat, it was necessary to first detach the front portion of the seat and then detach the vest-harness from the seat. While the vest-harness helped to restrain the child within the seat while permitting a great deal of relative movement within the seat, the vest-harness was secured to the chair at the waist portion thereof and did not provide any shoulder restraints for the child within the chair during sudden stop or crash conditions.

SUMMARY OF THE INVENTION

The present invention provides a new and improved infant safety car seat having a superior infant retaining harness and detachable front crash pad associated therewith capable of being simultaneously disconnected by a single quick release means for quick removal of the infant from the seat in an emergency.

The present invention provides a new and improved infant safety car seat having a lap safety belt mounted completely on a front crash pad which is detachably connected to the car seat whereby removal of the front crash pad simultaneously frees the child from the restraints of the lap belt.

The present invention provides a new and improved infant safety car seat of the type used for infants and adapted to rest on and be releasably secured to a conventional automobile seat comprising back, front and side portions secured together to form a vertically extending substantially enclosed box-like structure, a bottom portion secured to said seat for resting on said automobile seat, said back and side portions extending above said front portion with said side portions above said front portion being outwardly flared with respect to the interior of said structure so as to provide side supports for an infant's head, a seat portion spaced from said bottom portion and means intermediate said seat portion and said bottom portion for receiving a conventional automobile safety seat belt for securing said seat on said automobile seat, additional belt means having connector means cooperating with a slot in the upper end of said back portion and adapted to extend about the back portion of a conventional automobile seat, said front portion comprising a rigid cross member spaced above said seat portion and extending between and detachably secured to said side portions, said cross member having a broad upper surface slanting upwardly away from said back portion to provide a safety dash, crotch guard means secured to and extending downwardly from said cross member intermediate said side portions to define two leg openings and shoulder harness means connected at the upper end to spring restraint means located in said back portion of said seat with the lower end thereof detachably connected to said crotch guard and lap belt means adjustably mounted on said detachable front portion for cooperation with an infant in said seat when said front portion is secured to said seat portion. The operation of a single latch will detach the cross member from both side members and movement of the cross member away from the side members will automatically disconnect the lower end of the shoulder harness means from the crotch guard and remove the lap belt means.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 4 is a side elevation view, partly in section and partly broken away, of the infant safety car seat according to the present invention showing the spring biased shoulder harness retaining arrangement and latch means for detachably connecting the front portion to the seat.

DETAILED DESCRIPTION OF THE INVENTION

Figure 1:
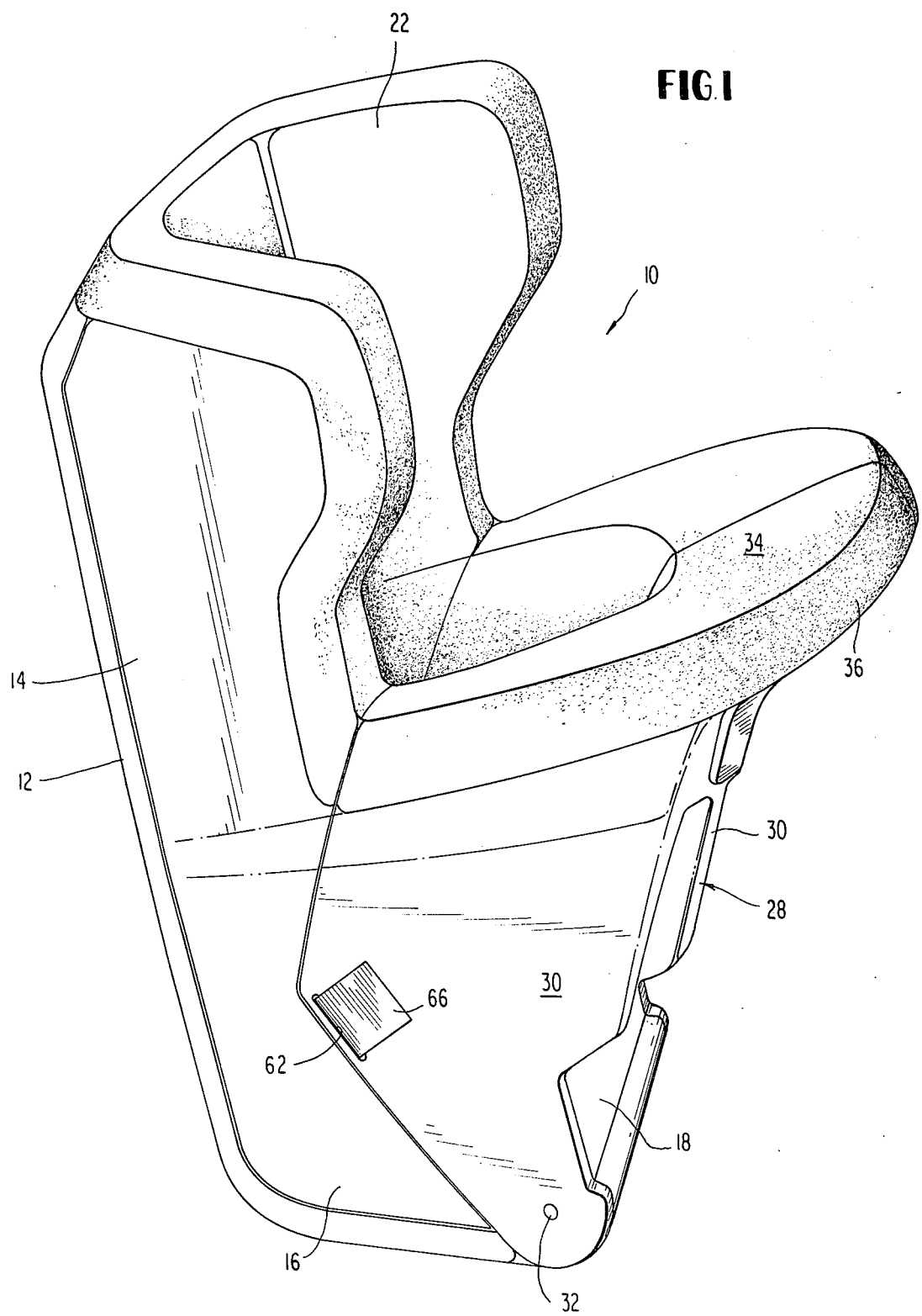
FIG. 1 is a perspective view of the infant safety car seat according to the present invention with the front portion secured in operative position with respect to the seat.

The seat 10 according to the present invention is constructed similar to the seat shown in FIGS. 12–18 of applicant's previous U.S. Pat. No. 3,563,600. The seat, which is constructed of molded plastic material, is comprised of a back portion 12, side portions 14 and a base portion 16 which are of integral onepiece construction. The upper portions of the sides 14 flare outwardly from the back portion 12 at an angle sufficient to partially encompass the head of the infant in the seat without presenting a forwardly directed edge which might cause injury in the event of an accident. A seat 20 is mounted on a riser 18 which is adapted to be integrally molded with the base portion 16 or constructed as a separate member and secured to the base portion 16 by any suitable means. The front portion of the riser 18 is provided with a concave recess for the reception of a standard automobile seat belt which is not illustrated and which does not form a part of the present invention.

The back, side and seat portions are provided with suitable padding 22 such as foam rubber or the like. The back portion 12 is provided at the upper end thereof with a recess 24 for the reception of a hook member adapted to be slidably mounted on a belt which extends vertically about an automobile seat back to secure the upper end of the car seat 10 to the automobile seat back. The hook member and belt are not illustrated in the present application and do not form any part of the present invention and are substantially identical to the hook portion 140 and belt 142 disclosed in U.S. Pat. No. 3,563,600.

Figure 2:
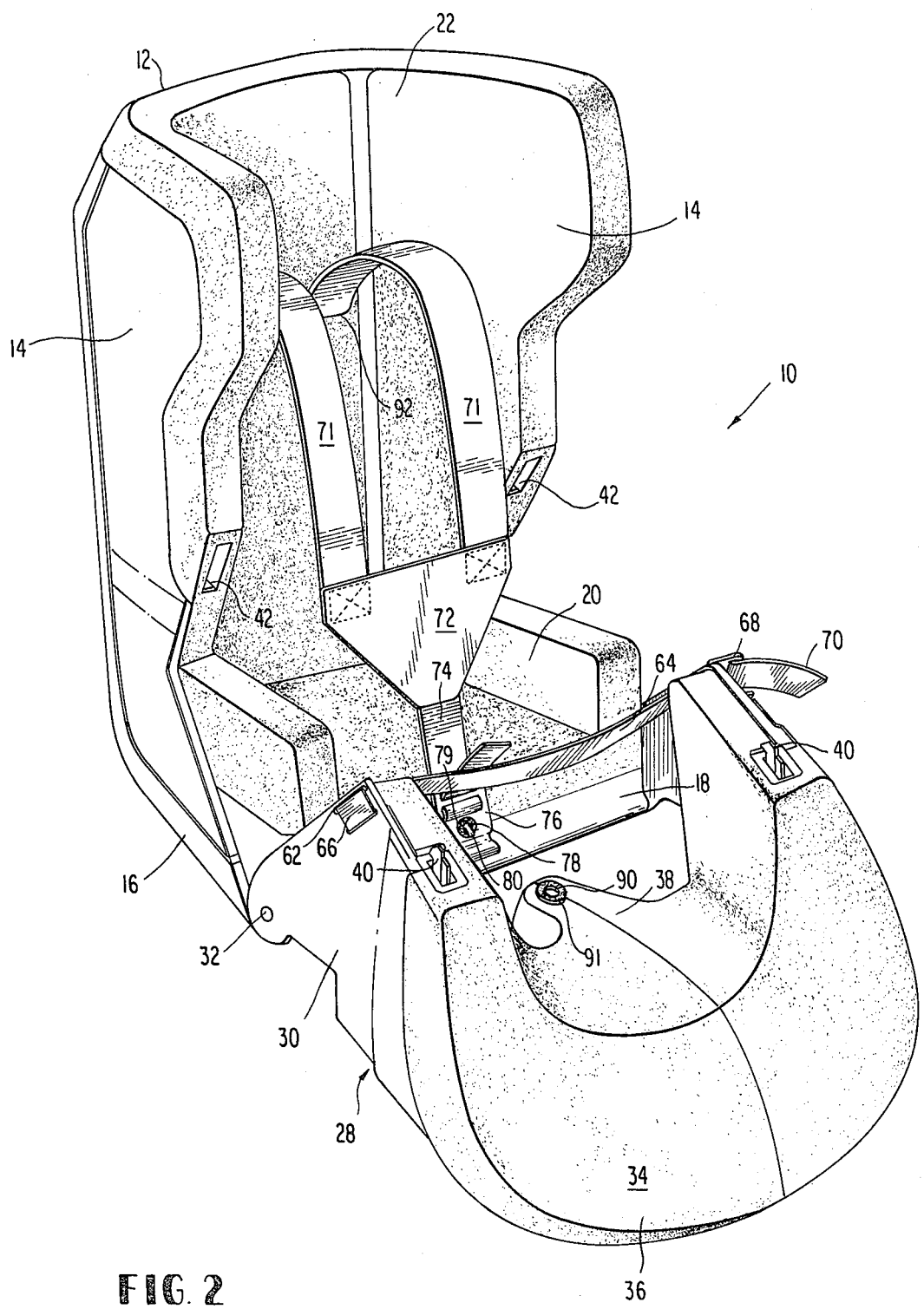
FIG. 2 is a perspective view of the infant safety car seat with the front portion unlatched and pivoted to the open position relative to the seat showing the lap belt and shoulder harness.

The front member 28 is provided with a pair of vertical side members 30 which are pivoted to the lower front portions of the riser 18 on opposite sides thereof by means of suitable pivots 32 whereby the front member can be pivoted between the positions shown in FIGS. 1 and 2. An upper cross piece 34 extends between the two side members 30 and the cross member is provided with a broad flat upper surface which is slanted upwardly away from the back portion 12. This flat upper surface is covered with suitable padding material 36 similar to the padding material 22 on the back and seat portions. The broad flat upper surface of the cross member 34 provides a large impact area for the child in the event that the child is thrown forwardly as a result of a collison or quick stop. The large surface area enables the force to be distributed evenly with respect to the chest of the child and substantially reduces the risk of chest or rib injuries. A crotch support bar 38 is integrally formed with the cross member 34 and extends downwardly therefrom to divide the opening between the side members 30 into two separate leg openings. The lower end of the crotch member 38 terminates at the seat 20 and is protected on the inner surface thereof by an extension of the padding 36 on the cross member 34.

In order to hold the front portion 28 of the infant seat in latched condition with respect to the rear and side portions of the infant seat to encapsulate the child within the seat, a suitable latching mechanism is provided within the hollow confines of the cross member 34. The latch mechanism as illustrated in FIG. 4 is substantially identical to the latch mechanism disclosed in FIGS. 16–18 of applicant's prior U.S. Pat. No. 3,563,600 and therefore only a brief description of the construction and operation of the latch mechanism will be set forth. The latch mechanism is provided with two latches, one at each side of the cross member 34 which cooperate with corresponding latches secured to the side members 14 immediately above the arm rests 36 extending upwardly from the seat 20. Only one latch, however, has been illustrated in the side elevation view of FIG. 4, it being understood that two latch mechanisms are provided as illustrated in FIG. 16 of applicant's prior patent. The particular latch mechanism provides for a quick release of the latch to enable the front portion of the car seat to be removed from the rear portion and allow the child to be removed from the seat. When placing the child in the seat it is only necessary to pivot the front portion of the seat upwardly and rearwardly about the pivots 32 to bring the latch members 40 into engagement with the latch plates 42 whereupon automatic latching will take place. To unlatch the front portion 28 from the rear portion 12 of the seat it is only necessary for a person to grasp the plate 44 and pull it forwardly thereby pivoting the member about the pivot pin 46. The forward pivotal movement of the member 44 will pull the draw bar 48 forwardly and accordingly move the pull rods 50 in a forward direction away from the back portion of the seat. Since pull rods 50 are connected to the extension 52 of the latch retaining plate 54, the extension 52 will also move forwardly away from the rear portion of the seat. As viewed in FIG. 4, this movement will be to the right and as the plate 54 moves to the right the connection thereof with the spring member 56 will cause the latch plate 40 to pivot upwardly about the pivot point 58. This pivotal movement will enable the latch shoulder 60 to clear the edge of the opening in the latch plate 42 and the entire front portion of the infant seat will be able to pivot forwardly and downwardly away from the rear portion of the seat.

Figure 3:
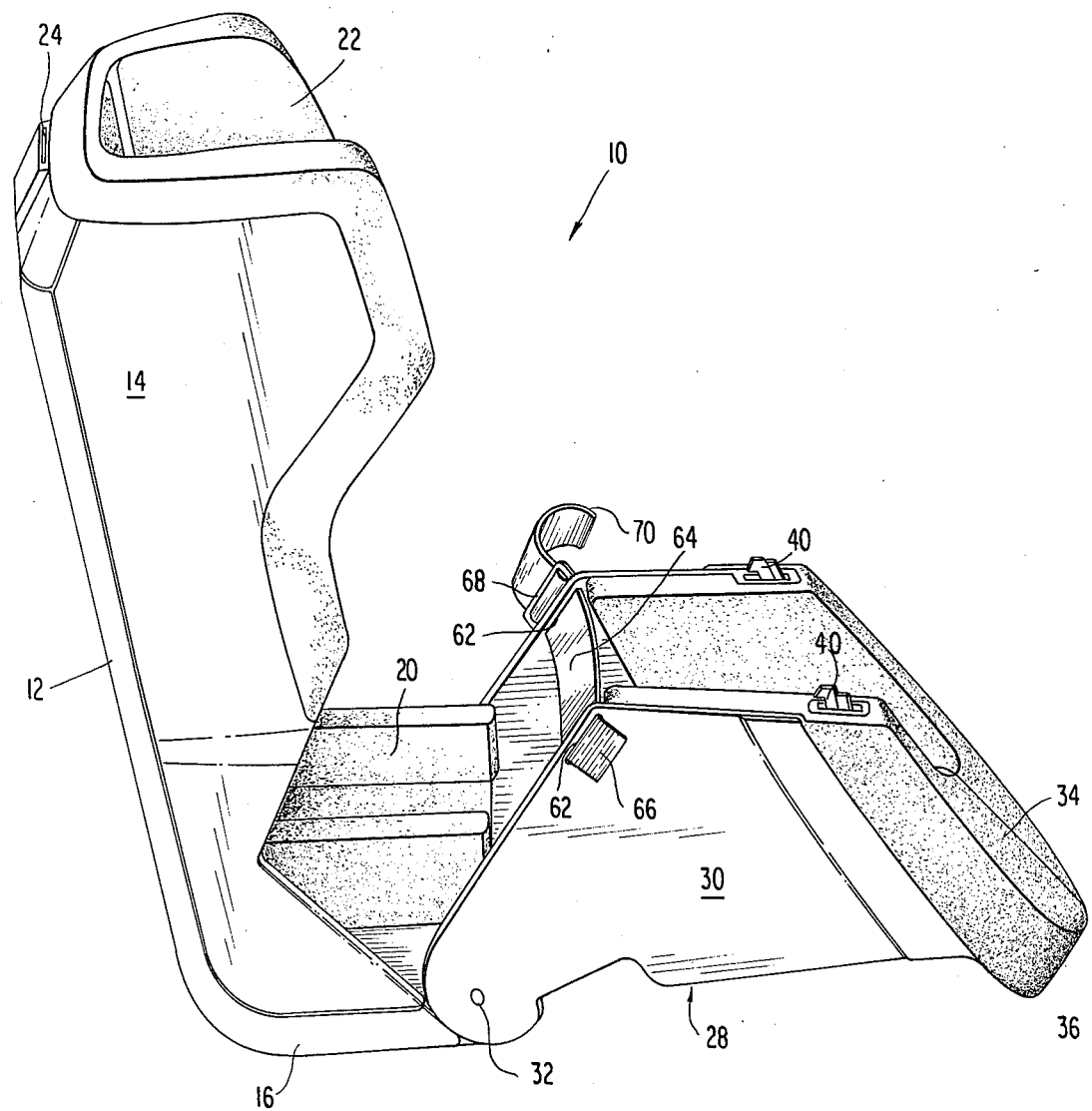
FIG. 3 is a further perspective view of the infant safety car seat according to the present invention showing the front portion in the unlatched, opened condition relative to the seat.

The side portions 30 of the front portion are each provided with a slot 62 below each latch member 40 and a lap belt 64 extends therethrough from one side to the other of the front portion 28. One end 66 is secured to the side wall 30 of the front portion by any suitable means while the other end 70 of the belt is provided with an adjustable slider 68 which will limit the movement of the belt toward the interior of the front portion 28 and thereby adjust the tension of the lap belt across the lap of a child seated in the infant safety car seat when the front portion 28 is latched to the rear portion 12 as shown in FIGS. 1 and 4. Since the lap seat belt 64 is mounted entirely on the front seat portion 30, the child will automatically be freed from restraint by the seat belt as soon as the front seat portion 28 is unlatched and pivoted forwardly to the position shown in FIGS. 2 and 3.

The car seat is further provided with a pair of shoulder restraint straps 71 which are connected to a substantially triangular lower chest and abdominal support piece 72 which in turn is connected to a crotch stap 74 adapted to extend downwardly between the legs of the child seated in the infant car seat. An adjustable buckle/retainer plate 76 is connected to the lower end of the crotch belt 74 for adjustable movement toward and away from the protector 72. The plate 76 is provided with an aperture 78 adapted to fit over a pin 80 having a downturned end 82. The pin 80 is integral with and protrudes substantially perpendicularly from a plate 84 adapted to be secured to the upper front portion of the seat 20. The lower end of the plate is provided with a forwardly projecting flange 86 which enables a person to readily grasp and manipulate the plate 76 onto or off of the pin 80.

The lower end of the rigid crotch portion 38 on the front portion is provided with an aperture 90 having a ring 91 of VELCRO material secured about the periphery of the aperture by any suitable means such as an adhesive. A complimentary ring 79 of VELCRO material is secured about the periphery of the aperture 78 by any suitable means such as an adhesive on the face of the buckle-retainer 76 facing toward the front of the seat which is adapted to mate with and connect to the VELCRO material 91 about the aperture 90.

The upper ends of the shoulder straps 71 extend through slots 92 in the back member 12 defined by a pair of diverging guide plates 94 and 96 which will facilitate the smooth entry of the shoulder straps through the slots 92. The back portion is provided with a hollow recess 98 for the reception of a spring restraint system for the shoulder straps. Each strap 71 extends between a pair of guide rollers or pins 100 and 102 located above and below the slots 92. The shoulder straps extend downwardly through the chamber 98 about a further pin or roller 104 and then pass upwardly to where the end of the shoulder strap is secured to a bracket 105 by means of rivets 108. The pin or roller 104 is connected to a rod 106 having a plate 107 secured to the lower end thereof. The rod 106 passes through a heavyduty spring 109 and a light spring 110 both of which are located within a cylindrical housing 112 secured within the recess 98. The shoulder belt tension is maintained by the light spring 110 which will allow the child to lean forward and move to a limited degree within the confines of the seat. However, upon sudden braking or crash impact, the resistance of the heavyduty spring 109 will come into play to decelerate the forward movement of the child to reduce the impact of the child's body upon the front crash pad of the seat.

In summary, when it is desired to place a child in the seat the shoulder harness can be flipped over the back of the seat and the front portion unlatched and lowered to the position shown in FIG. 2. After the child has been placed in the seat, the shoulder harness can be brought forward to place the shoulder straps over the shoulders of the child and the plate on the end of the cross strap can be grasped and pulled downwardly against the force of the light spring to hook the plate on the pin projecting forwardly from the seat portion. The front portion can then be pivoted upwardly and rearwardly to bring the latches into engagement with the latch plates for automatically locking the front portion to the rear portion with the lap belt in proper position overlying the crotch strap as best seen in FIG. 4. In this position the two VELCRO rings will be pressed into engagement with each other. When it is desired to remove the child from the seat, it is only necessary to pull the latch plate forwardly to simultaneously unlatch both sides thereby allowing the front portion to pivot forwardly and downwardly relative to the rear portion. Due to the engagement of the VELCRO fasteners with each other, the latch plate will be moved forwardly and downwardly to automatically unhook the latch plate from the pin. Continued downward pivotal movement of the front portion will then automatically cause the two portions of the VELCRO fasteners to peel apart and separate. The shoulder harness can then readily be flipped upwardly to permit quick and easy removal of the child from the seat.

The infant safety seat according to the present invention provides greater side protection due to the presence of the outwardly flared upper side portions, greater forward protection because of the decelerating shoulder belt tension arrangement and greater thoraco-abdominal protection due to the presence of the enlarged triangular portion of the harness between the shoulder straps and the crotch strap. In those instances where it is essential that the child be removed from the automobile as quickly as possible, the single latch operation for freeing the child from all restraints is very effective. The placement of the latch release handle under the front impact area as best seen in FIGS. 1 and 4 makes it extremely difficult for the child to deliberately or accidentally release the locking mechanism.

While the invention has been particularly shown and described with reference to a preferred embodiment thereof, it will be understood by those in the art that various changes in form and details may be made therein without departing from the spirit and scope of the present invention.

What is claimed is:

1. A safety car seat of the type used for infants and adapted to rest on and be releasably secured to a conventional automobile seat comprising bottom, seat, back and side portions integrally secured together, a front portion comprising a rigid cross member fixed above said seat portion and a crotch portion extending downwardly from said cross member to said seat portion to define a pair of leg openings, means detachably connecting said cross member to said side portions, infant harness means including shoulder portions and a crotch portion, means for connecting said shoulder portions to said back portion and quick release means for detachably connecting said crotch portion of said harness portion to said seat portion and said crotch portion of said front portion.

2. A safety car seat as set forth in claim 1 wherein said quick release means is comprised of a plate having an aperture therethrough secured to said crotch portion of said harness, means defining an aperture in the lower end of said crotch portion of said front portion and pin means secured to said seat portion and extending through said apertures when said front portion is latched to said side portions.

3. A safety car seat as set forth in claim 2 further comprising complementary detachable fastener parts secured to said plate and said crotch portion of said front portion adjacent said aperture whereby upon movement of said front portion away from said side portions said plate will be lifted off said pin means prior to separation of said detachable fasteners.

4. A safety car seat as set forth in claim 1, wherein said means for securing said shoulder portions of said harness to said rear portion of said seat are comprised of guide means for guiding said shoulder portions through an opening adjacent the upper portion of said back portions of said seat, spring means mounted on said back member and means connecting the ends of said shoulder portions to said spring means to provide a resilient restraining force.

5. A safety car seat as set forth in claim 4 wherein said spring means is comprised of a strong coil spring and a weak coil spring disposed in end-to-end relation, a rod extending through said springs having a flange at one end thereof disposed in engagement with said light spring and means for movably connecting said shoulder portions of said harness with the other end of said rod whereby limited forward movement of a child engaged by said harness would be permitted under restraint of said weak spring with said strong spring resisting excessive movement of said child toward said front portion upon sudden deceleration of an automobile.

* * * * *